United States Patent [19]

Carter et al.

[11] Patent Number: 5,229,451

[45] Date of Patent: * Jul. 20, 1993

[54] THERMOTROPIC POLYMER

[75] Inventors: Neil Carter, Northwich; Brian P. Griffin, St. Albans; William A. MacDonald, Guisborough; Timothy G. Ryan, Upton, all of England

[73] Assignee: Imperial Chemical Industries PLC, United Kingdom

[*] Notice: The portion of the term of this patent subsequent to Feb. 20, 2007 has been disclaimed.

[21] Appl. No.: 453,252

[22] Filed: Dec. 20, 1989

Related U.S. Application Data

[63] Continuation of Ser. No. 143,703, Jan. 14, 1988, abandoned.

[30] Foreign Application Priority Data

Jan. 16, 1987 [GB] United Kingdom ............... 8700921

[51] Int. Cl.$^5$ .................... C08J 3/20; C08K 3/34; C08L 67/03
[52] U.S. Cl. .................... 524/493; 523/200; 523/216; 524/492; 524/789
[58] Field of Search ............ 523/216; 524/493, 496, 524/497, 847, 492, 789

[56] References Cited

U.S. PATENT DOCUMENTS

| | | | |
|---|---|---|---|
| 4,067,852 | 1/1978 | Calundann | 528/190 |
| 4,267,304 | 5/1981 | Feasey et al. | 528/190 |
| 4,546,126 | 10/1985 | Breitenfellner et al. | 524/445 |
| 4,611,025 | 9/1986 | Akkapeddi et al. | 524/451 |
| 4,708,976 | 11/1987 | Ryan | 523/300 |
| 4,739,007 | 4/1988 | Okada et al. | 523/216 |
| 4,902,772 | 2/1990 | Carter et al. | 523/200 |

FOREIGN PATENT DOCUMENTS

| | | | |
|---|---|---|---|
| 5106256 | 2/1979 | Japan | 523/216 |
| 57-13015 | 6/1982 | Japan | 523/216 |
| 0032841 | 8/1983 | Japan | 523/216 |
| 1095931 | 12/1967 | United Kingdom . | |
| 1095932 | 12/1967 | United Kingdom . | |
| 1373531 | 11/1974 | United Kingdom . | |
| 1403794 | 8/1975 | United Kingdom . | |
| 1419199 | 12/1975 | United Kingdom . | |
| 1453713 | 10/1976 | United Kingdom . | |
| 1506222 | 4/1978 | United Kingdom . | |

Primary Examiner—Melvyn I. Marquis
Assistant Examiner—D. R. Wilson
Attorney, Agent, or Firm—CD&C

[57] ABSTRACT

A thermoplastic polymer composition comprising a thermotropic polymer and 0.025 to 5% by weight of the composition of a finely dispersed particulate inorganic additive wherein the additive is a material having at least 95% by weight of particles with at least one dimension less than 1 micron and preferably less than 0.1 micron and is an organophilic or organophobic material which has a settling volume of at least 10 when measured in a liquid in which the particulate material is compatible. The presence of the inorganic additive in the thermotropic polymer gives rise to an improved processing behavior.

5 Claims, 1 Drawing Sheet

THERMOTROPIC POLYMER

This is a continuation of application Ser. No. 07/143,703, filed Jan. 14, 1988, now abandoned.

This invention relates to compositions of thermoplastic polymers which form anisotropic melts containing small amounts of inorganic additives in particulate form.

In recent years there has been considerable activity in the development of polymers which have a composition which results in the polymer molecules arranging themselves with a degree of alignment when a melt is formed from the polymers. Domains of aligned polymer molecules are observed in the melt. Such polymers have been variously termed as thermotropic polymers, liquid crystalline polymers or anisotropic-melt-forming polymers. The propensity of such polymer molecules to align with each other gives rise to products of high stiffness and strength. These high levels of physical properties attainable give rise to the term "self reinforcing polymers" sometimes applied to these types of polymers.

Whilst the levels of properties obtained from a given polymer are exceptionally good improvements are always being sought.

The present invention provides compositions of liquid crystalline polymers which have significantly improved physical properties with respect to the base polymer of the composition.

According to the invention there is provided a thermoplastic polymer composition comprising a thermotropic polymer and 0.025 to 5% by weight of the composition of a finely dispersed particulate inorganic additive wherein the additive is a material having at least 95% by weight of particles with at least one dimension less than 1 micron and preferably less than 0.1 micron and is an organophilic or organophobic material which has a settling volume of at least 10 when measured in a liquid in which the particulate material is compatible. It is preferred that the particulate material is capable of exhibiting a swelling volume of at least 20 in a compatible liquid.

Surprisingly, although the concentration of additive present cannot be regarded as a sufficient concentration of additive to provide significant reinforcement in the conventional sense of reinforcing, the presence of the additive can give rise to a significant improvement in physical properties, particularly tensile strength.

The major advantages of the invention are that orientation related properties of the compositions (both rheological and solid state) are substantially improved compared to polymer not containing finely divided particulate material. The invention enables much greater freedom in processing conditions. For example, the pressure that needs to be applied in packing the mould need not be so great for the achievement of good properties. It is also generally possible to process the polymer at a lower temperature than when the particulate additive is not present. These factors are particularly beneficial in compositions with a comparatively narrow processing temperature range. A preferred composition comprises an anisotropic melt forming polymer containing sufficient of the finely divided particulate material to reduce the melt viscosity of the composition at a given temperature in comparison with the melt viscosity in the absence of the particulate material by at least 10% when measured at a processing shear rate of 100 sec$^{-1}$. The ability of the particulate additive to reduce viscosity is particularly surprising, in that if any change in viscosity were to be expected from adding a finely divided filler to the melt it would be an increased viscosity.

Furthermore, a preferred composition is provided containing sufficient of the particulate material to improve the tensile strength of mouldings of the composition by at least 10% when compared to a similar composition in the absence of the particulate material.

Whilst the explanation for these improvements is not wholly understood it is believed that they result from modifications which are brought about in the melt rheology of the composition as a consequence of the presence of the additives in the melt.

DETAILED DESCRIPTION OF THE INVENTION

Figure 1:
FIG. 1 is a micrograph showing the particulate additive dispersion in a molding.

In order to maximise the effects obtained with the minimum of additives it is necessary to ensure that the particulate material is present in finely divided form and that agglomeration of the additive particles is minimised. In order to achieve the desired degree of dispersion the particulate material should be provided with a surface treatment and/or dispersing agents and/or swelling agents should be included in addition to the particulate material to aid dispersion.

The particulate materials can be intimately dispersed in the polymeric materials by a variety of techniques. In the simplest form the additive or additives can be compounded into the polymer whilst the polymer is molten using conventional compounding equipment such as a screw extruder. Optimum results are obtained by ensuring that the mixing in the melt is performed under conditions of high shear. Equipment and screw geometries suitable for preparing pigmented polymer compositions are generally suitable for providing compositions according to the present invention.

Alternatively, the additive particulate material can become intimately dispersed as a result of its being present during the polymerisation process for manufacturing the liquid crystalline polymer. Additives used to obtain an intimate dispersion, as a result of the polymerisation process, should only be used if the additives do not have a serious adverse effect on the polymerisation rate or degree of polymerisation attainable.

When included in dispersion polymerisation processes the particulate material may be present as an inert additive or it may provide a dispersing function enabling the polymer to be produced as a suspension of fine particles.

Whatever method is used to obtain an intimate dispersion of the additive it may be desirable to include surface active materials either integrated with the additive or as separate materials to aid the uniform dispersion of the additive in the polymer.

The liquid crystalline polymer compositions having improved physical properties may be achieved using a wide variety of particulate additive types. Suitable additives are characterised in having a very fine particle size (with 95% by weight of the additive having at least one dimension of the particle less than 1 micron, and preferably less than 0.1 micron). Suitable materials must also be capable of being dispersed in the thermotropic polymer with a minimum of aggregation of additive particles. This capability of being dispersed in the polymer must apply to all the methods in which the additive is dispersed in the polymer. Thus, in the case of the use of a preformed polymer the additive must be readily dispersible in a melt of the polymer. In the case of an additive which is to be dispersed by virtue of its presence as an inert additive during a polymerisation process the dispersibility considerations are essentially the same if the polymerisation is a melt process. If the additive is required to support the production of a suspension of particles which are kept in a stable state, without flocculation during a polymerisation process the dispersibility considerations are much more sophisticated. However, it has been found that additives suitable for the above purposes can be identified by their sedimentation performance in a compatible liquid. Materials which have a tendency to remain suspended in a compatible liquid are suitable for use in the invention. A convenient test for measuring the dispersion characteristics involves taking a sample of the additive (already in a form in which 95% by weight of the particles have a dimension of less than 1 micron) and adding it gradually to solvents with which the additive is expected to be compatible. For example, the dispersion characteristics of an organophilic additive should be assessed in an organophilic solvent such as methylene chloride or toluene. An organophobic additive is conveniently assessed in water. In order to measure the swelling volume 10 g of sample are added to 100 milliliters of solvent in a 100 milliliter graduated measuring cylinder. After allowing to equilibrate for 30 minutes the volume of the additive in the cylinder is measured in tenths of milliliters. This is called the "swelling volume" and should preferably be in excess of 20 ml.

A convenient method of assessing the settling volume is to mix 10 g of the additive in 100 ml of solvent using a high shear mixer, such as a Silverson mixer. After dilution to provide 1 g of the additive (based on its inorganic content) per 100 ml of solvent 100 ml of the dispersion is placed in a 100 milliliter graduated measuring cylinder. After equilibrium is reached (usually after about 24 hours) the volume occupied by the sedimented additive is measured and should be at least 10 ml. This value is termed the "settling volume". The settling volume may be measured on a more dilute dispersion, say 0.1 g in 100 ml solvent, if it is required to distinguish between additives of very high dispersibility.

Although the additive will not necessarily be employed in the solvent in which the compatibility or swelling volume is measured this test gives a good guide as to its suitability in the various aspects of the invention. Thus a material which has good compatibility and high settling volume in an organic solvent will be suitable for use in a dispersion polymerisation process in which the continuous phase is an organic liquid medium such as paraffin oil. A material which has a high compatibility and high dispersibility in water will not be suitable for such a purpose but can be compounded into a preformed polymer, particularly if it has been swollen with water prior to compounding.

It is preferable that the surface area of the particulate material be at least 10 $m^2/g$ preferably at least 100 $m^2/g$ and more preferably at least 200 $m^2/g$. Standard methods can be used to obtain particle surface areas including the BET gas adsorption method (S. Bruanauer, P. H. Emmett and E. Teller, J Amer Chem Soc., 60, 309, 1938) and preferably an adsorption from solution method such as dye absorption (Pan Thi Harg, G. W. Brindley, Clays and Clay Minerals 18, 203, 1970). It is preferable that the surface area of particulate material available within the anisotropic melt forming polymer in the melt form be of the order of 1 $m^2/g$ of polymer and that this surface area be achieved using less than 5% by weight of the particulate material and more preferably less than 2.5% by weight with respect to the weight of polymer. At these levels of additive the beneficial improvement in properties can not be attributed to reinforcement by the particulate material.

The particulate materials having at least one dimension of less than 1 micron may be essentially spherical particles such as the high surface area silicas produced by flame hydrolysis.

The preferred particulate materials for use in the invention have an aspect ratio (length to breadth ratio of average particles) of greater than 2:1, and more desirably greater than 10:1, in addition to having one dimension less than 1 micron. The particles may be layer minerals that have been chemically and mechanically delaminated. It will be appreciated that although it is required that in order to obtain the beneficial improvements in physical properties the finely divided particulate material must eventually be present having at least one dimension less than 1 micron in the shaped articles formed from the composition and the melt from which the shaped articles are formed it is not necessary that it is in this state of subdivision when added to the preformed polymer or to the polymerisation medium because a reduction in size can be achieved in the intermediate process of forming the shaped article. However, it is preferred that the additives conform with the requirement that at least one dimension is less than 1 micron and preferably less than 0.1 micron prior to using it either for compounding or in a polymerisation process. It is particularly important when the additive is used as a dispersion aid that it is present in as sub-divided a form as possible because its effectiveness as a dispersant at a given concentration of additive will be dependent to a large extent on the degree of subdivision.

The preferred inorganic additives are naturally occurring layer minerals which have been given a surface treatment to improve their dispersibility in a liquid carrier. The preferred layer minerals are those having a significant layer charge resulting from the presence of cations within the layers and on the faces and edges of the layer minerals. These cations give rise to an exchange capacity enabling organophilic chains to be grafted onto the layer mineral by cation exchange. This exchange is typically achieved using primary or tertiary amines of sufficient chain length to provide organophilicity. Generally, a chain length of at least 8 carbon atoms is required, to produce a material of significant organophilicity (i.e. having a swelling volume of at least 20) although longer chain lengths will be required if the exchange capacity of the layer mineral is low. The chemistry of these processes are discussed in the book "Clay Mineralogy" 2nd Edition, 1968 by Ralph E. Grim (McGraw Hill Book Co. Inc.) particularly Chapter 10.

Such organophilic layer minerals are readily available as commercial products. Thus layer mineral organo-clay complexes formed by the reaction of a high molecular weight organic cation (for example dioctadecyl dimethyl ammonium) with a highly refined layer mineral (for example bentonite or hectorite), such as organophilic bentonite is sold by ECC International Ltd as 'Claytone 40'. Organophilic hectorite is sold by NL Chemicals Ltd as 'Bentone' 38. Dispersion of the layer minerals in an organic media in non polar hydrocarbons can be increased by the addition of delamination activators (low molecular weight polar organic dispersing materials) such as methanol, acetone or propylene carbonate and by the use of high shear mixing equipment. High surface area silicas may be colloidally dispersed in organic media using silane coupling agents or using polymeric dispersing agents, for example copolymers as described in British Patent Nos. 1 095 031; 1 095 932; 1 373 531; 1 403 794 and 1 419 199.

A preferred embodiment of the invention is that the composition is prepared by incorporating the finely divided particulate material into the anisotropic melt forming polymer as the result of a polymerisation procedure which uses the particulate material as a stabiliser resulting in the product being obtained as particles dispersed in a fluid heat transfer medium.

Preferably, the mean number average polymer particle size of the dispersion produced is less than 500 um, and are generally less than 100 μm. This is a particularly valuable aspect of the invention because it has been found that not only can the particulate material be efficiently dispersed but that chosen types of particulate material can have the added advantage of providing a dispersion stabilising effect during the polymerisation, enabling a dispersion of polymer particles to be produced without flocculation. A major advantage of this procedure is that polymers such as polyesters can be produced at higher molecular weight than is conveniently possible using the so-called melt polymerisation procedure in which the reactants are polymerised in molten condition in a reactor. The viscosities reached as the molecular weight increases are such that stirring of the reactants is difficult. Discharge of the product from the reactor is a further problem in that a heel of polymer is generally left in the reactor requiring cleaning of the vessel to be performed before charging the succeeding batch.

Particulate materials for use in such polymerisation processes must be chosen with a view to the need to maintain dispersion stability during the whole polymerisation cycle and bearing in mind the high polymerisation temperatures required for the production of most anisotropic melt forming materials prepared in condensation processes. Methods of polymerisation have been devised using particulate dispersing aids which provide such stabilisation. Suitable particulate stabilisers consist of a finely, divided particulate material comprising a core portion insoluble in the organic liquid medium, which is to provide the disperse phase of the polymerisation, and associated with the core portion, preferably by covalent or ionic bonding, hydrocarbon chains containing at least 8 carbon atoms, the hydrocarbon chains being soluble in the organic liquid medium.

The organophilic layer minerals previously referred to are particularly useful in the context of polymerisation aids in that they contain an insoluble core portion of inorganic layer mineral and long organophilic chains pendant therefrom soluble in typical materials suitable for the disperse phase in dispersion polymerisation. The exchanged clays containing a long chain organic cation will be soluble in typical inert high boiling disperse phase materials such as the hydrogenated terphenyls, polychlorinated polyphenyls, polyaromatic ethers and paraffin oil.

The inert organic liquid in which the dispersion polymerisation is conducted and which acts as a heat transfer medium for the reaction must be unreactive towards the reactants, have a boiling point substantially in excess of the reaction temperature used and must have sufficient thermal stability to withstand the conditions required for polymerisation of the reactants. Suitable materials include the terphenyls, particularly hydrogenated terphenyls commercially available under the trade name 'Santotherm'; a eutectic mixture of 73.5 percent diphenyl oxide and 26.5 percent diphenyl, commercially available under the trademark 'Dowtherm' A; mixtures of various polychlorinated polyphenyls such as chlorinated biphenyls typified by those commercially available under the trademark 'Therminol' FR; polyaromatic ethers and mixtures thereof such as those composed of mixtures of meta and para isomers, having boiling ranges in excess of 400° C., typical representatives of which are available commercially under the trademark 'Therminol' 77 and paraffin oils. the paraffin oil should be a material, the major part of which should have a boiling point of at least 320° C., although minor amounts of lower boiling materials can be tolerated. Typical paraffin oils are available from Castrol under the trade names 'Whitemor' and 'Puremor' White Oils, from Shell under the trade name 'Pallidex' and from Burmah under the trade name 'Castrol' WOM 14.

Inorganic additives may also be used in dispersion polymerisation, even though they are not effective as dispersion aids in their own right, if they can act synergistically with other polymerisation aids. Thus finely divided inorganic materials, preferably treated so as to have organophilicity can be used in combination with polymeric organic dispersing agents which are themselves designed to act as dispersing agents. These polymers should carry at least one reactive functional group per chain. These functional groups may associate with or react with corresponding reactive functional groups on the surface of the finely divided inorganic material. Alternatively, the functional group may react or associate with a corresponding functional group of the reactants or partially polymerised reactants thus providing an associated pendant chain extending from a polymerising droplet into the disperse medium in which the droplet is dispersed.

The combination of inorganic additive and polymeric dispersing agent shall also fulfil the conditions that the inorganic additive should have 95% by weight of its particles with at least one dimension less than 1 micron and a settling volume of at least 10 measured in a compatible liquid.

The polymer carrying the functional group should have a polymer chain of molecular weight at least 500, and preferably at least 2,000, which chain is soluble in the inert organic liquid medium, at least under the conditions of polymerisation. The functional group may be chosen from carboxyl, hydroxyl, amino, amido and sulphonic groups. For example, a carboxyl group in the polymeric dispersing group may react with a corresponding hydroxyl group. The corresponding hydroxyl group may be provided by one of the reactants or a partially polymerised product of the reactants or it may be present at the surface of the inorganic material. The polymeric dispersing material should have sufficient thermal and chemical stability to remain effective under the polymerisation conditions used.

Although the specially designed block and graft copolymer amphipathic stabilisers of the type described in British Patent Nos. 1 095 931, 1 095 932, 1 373 531, 1 403 794 and 1 419 199 may be used as the polymer carrying the functional group it is preferred for reasons of cost and convenience to employ simpler random copolymers. Although the mechanism by which these random copolymers contribute in the presence of the inorganic material to stabilisation of the polymeric material being formed is not clear, they may, at least in part, act as precursors for stabilisers which are formed when a reactive group in the random copolymer enters into a reaction with a corresponding reactive group in at least one of the reactants or a partially polymerised product of the reactant or reactants. Additionally or alternatively, the reactive group of the random copolymer may react with a corresponding group on the surface of the inorganic material. The inorganic material may itself become attached to a particle of polymerising material by chemical reaction.

In addition to these possibilities of chemical reaction it is possible that the polymeric stabiliser carrying a reactive group and/or the inorganic material may act as stabilisers by virtue of being physically absorbed on particles of polymerising material.

The polymeric stabilisers used in conjunction with an inorganic material must be able to withstand the appropriate temperature conditions likely to be encountered during the polymerisation. This may be in excess of 250° C. or even 300° C. Whilst materials such as copolymers of olefins and ethylenically unsaturated carboxyl containing monomers are surprisingly effective at temperatures in excess of 250° C., in view of their expected thermal stability level, polymers of greater thermal stability are preferred. Random polymers containing functional groups and having a major proportion of units derived from monomers selected from styrene, substituted styrenes, alkyl methacrylates and acrylates are particularly useful. Thus examples of preferred stabilisers are random copolymers containing at least 50% by weight of units derived from monomers selected from styrene, substituted styrenes, alkyl methacrylates and acrylates and from 1 to 25% by weight, preferably 2 to 10% by weight of units selected from ethylenically unsaturated carboxylic acid or carboxylic acid anhydrides, wherein the functional groups may be at least partly neutralised.

The additives suitable for melt blending with the thermotropic polymers in situations where they are not required to perform a suspension stabilisation function during polymerisation can be chosen from those described as suitable for supporting polymerisation together with other additives of either organophilic or organophobic character which meet the requirements of 95% of the particles having at least one dimension of less than one micron and having the defined dispersibility characteristics in a compatible liquid. Additives suitable for inclusion for melt compounding into the thermotropic polymer which would probably not support a dispersion polymerisation include bentonite, hectorite, mica, talc and organo-clays containing alkyl chains with less than 8 carbon atoms in the alkyl group.

Thermotropic liquid crystal polymers for use in the invention include but are not limited to wholly aromatic polyesters, aromatic-aliphatic polyesters, aromatic polyazomethines, aromatic polyester-carbonates and wholly or non-wholly aromatic polyester-amides. The wholly aromatic polymers are considered to be "wholly" aromatic in the sense that each moiety present in the polymer contributes at least one aromatic ring to the polymer backbone and which enables the polymer to exhibit anisotropic properties in the melt phase.

The liquid crystal polymers which are preferred for use in the present invention are the thermotropic wholly aromatic polyesters. Recent publications disclosing such polyesters include (a) Belgian Patent Nos. 828 935 and 828 936, (b) Dutch Patent No. 7505551, (c) West German Patent Nos. 2 520 819, 2 520 820 and 2 722 120, (d) Japanese Patent Nos. 43-223, 2132-116, 3017-692 and 3021-293, (e) U.S. Pat. Nos. 3,991,013, 3,991,014, 4,057,597, 4,066,620, 4,075,262, 4,118,372, 4,146,702, 4,153,779, 4,156,070, 4,159,365 4,169,933, 4,181,792, 4,188,476, 4,201,856, 4,226,970, 4,232,143, 4,232,144, 4,238,600, 4,245,082 and 4,247,514 and (f) UK Application No. 2 002 404.

Wholly aromatic polymers which are preferred for use in the present invention include wholly aromatic polyesters and poly(ester-amide)s which are disclosed in U.S. Pat. Nos. 4,067,852, 4,083,829, 4,130,545, 4,161,470, 4,184,996, 4,219,461, 4,224,433, 4,230,817, 4,238,598, 4,238,599, 4,244,433, 4,256,624, 4,279,803 and 4,299,756. The disclosures of all of the above-identified U.S. patents and applications are herein incorporated by reference in their entirety. The wholly aromatic polymers disclosed therein typically are capable of forming an anisotropic melt phase at a temperature below approximately 400° C., and preferably below approximately 350° C.

The use of the additives described, particularly when used as polymerisation stabilisers, enable thermotropic polymer compositions to be produced having enhanced properties in comparison with the same polymer not containing the specified additives.

Preferred compositions can be produced having in combination a flexural modulus of at least 11 GPa, and more preferably at least 13 GPa and a tensile strength of at least 200 MPa, and more preferably at least 230 MPa. In a further aspect of the invention these properties can be achieved in combination with a flexural strength of at least 200 MPa and desirably at least 230 MPa.

The above values are obtained using the methods of ASTM D 790 for flexural modulus and flexural strength, and ASTM D638 for tensile strength. For example one preferred thermotropic polymer composition includes a polymer comprising 10 to 90 mole per cent of 2,6-oxynaphthoyl units and 90 to 10 mole per cent of 1,4-oxybenzoyl units as described in U.S. Specification No. 4 161 470. At least some of the hydrogen atoms of the aromatic rings may be substituted with halogen, alkyl groups of 1 to 4 carbon atoms and alkoxy groups of 1 to 4 carbon atoms. Compositions of such polymers and the additives used in the present invention enable the above combination of properties to be readily obtained. In contrast, the same composition made by a melt condensation process and not containing the additives used in the present invention have significantly lower properties. A further preferred composition contains from 15 to 40 mole per cent, preferably 27 to 40 mole per cent of 1,4 oxybenzoyl units, from 0.25 to 5 of 2,6-oxynapthoyl units with the balance of equal molar parts of units derived from hydroquinone and isophthalic acid.

As previously indicated the mechanism of the beneficial effect of the finely divided particulate additives on the anisotropic polymers is not fully understood but is believed to result from the influence of the additives on the polymers whilst they are in molten form. These influences on the molten form are believed to be carried through to the solidified mouldings or extrusions and to be the reasons that shaped articles of improved mechanical properties are obtained. It is known that the mechanical properties of products fabricated from thermotropic melts and the degree of "self-reinforcement" is dependent on the molecular orientation distribution produced partly as a result of the melt deformation history and partly as a result of the melt structure of the anisotropic polymer when deformed. It has also previously been shown that the application of shear to nematic liquid crystal polymer melts results in significant effects on the morphology of the melt. At very low oscillatory shear rates (less than 0.1 sec$^{-1}$) the number of boundaries (known as disclinations) between the regions of different orientation and the average distance between the disclinations, that is the domain size, remain sensibly constant because the disclinations merely move or tumble in the flow. At higher shear rates (greater than 0.1 sec$^{-1}$) the domain size reduces from 10 to 100 microns to typically 1 micron. At shear rates greater than 1 sec$^{-1}$ pure birefringence is observed and it is presumed that the domain size is of submicron dimension (no longer being optically resolvable). Relaxation of the applied shear results in the reappearance of the disclinations, that is the domain size can be measured as being greater than 1 micron.

It has previously been proposed in European Patent No. 5913 to fabricate shaped articles from thermotropic melts, particularly those which are difficult to fabricate, by applying a shear rate of at least 100 sec$^{-1}$ to the melt between relatively moving surfaces. This procedure provides a more readily processible melt of lower viscosity which can then be fabricated into the shaped article. The favourable morphology of the melt induced by the applied shear is retained for sufficient time to enable articles to be produced with enhanced properties.

It is believed that the enhancement in properties obtained from the compositions of the present invention result from the fact that the particulate additives influence the melt to a favourable morphology when aided by good compounding (high shear rate) conditions and that the presence of the dispersed additives assist in retaining or stabilising this favourable morphology once it has been achieved. Thus, a composition according to the invention can be melted and sheared by efficient compounding equipment to ensure thorough distribution of the particulate additive in the polymer melt. This composition can be extruded into granular or chip form with the benefit that the presence of the particulate additive enables the favourable morphology to be retained. The granule or chip may then be processed on conventional moulding equipment without the need to provide high shearing prior to moulding to obtain high levels of mechanical properties. It is, of course, possible to employ additional means of shearing prior to the moulding or other fabrication procedure, particularly if such pre-shearing is sufficiently severe to further improve the distribution of the particulate additives in the melt to be processed.

Whereas the application of high shear rates to liquid crystalline melts will reduce the domain size and give rise to improved mechanical properties in articles formed from these melts the benefits obtained will depend on the stability of the morphology after the shear ceases to be applied during the period in which an article is fabricated from the melt. It is believed that the compositions of the present invention show an increase in stability of the desirable morphology because the finely dispersed particulate materials provide a melt morphology stabilising effect, reducing the loss of orientation by domain size growth following stress relaxation. The consequential benefits expected from this ability to achieve and retain a small domain size include a reduction in the melt viscosity during processing and a widening of the temperature processing window in which optimum mechanical properties are obtained. The melt viscosity reduction is particularly applicable to low temperature processing whilst at high temperatures the benefit of the invention is seen in a greater retention of physical properties than when no particulate additive is present.

The present invention thus provides a method of controlling domain size or disclination density by providing a thermotropic melt containing sufficient disclination density-controlling particulate additives having at least one dimension less than 1 micron which additive is dispersed in the melt so that the average distance between particles is less than 10 microns, preferably less than 2 microns and, desirably, less than 1 micron. Preferred particulate material is anisotropic material having a largest dimension greater than the average distance between the particles when the additive is present at a concentration of 1% by volume of the melt.

The preferred method of obtaining such a distribution of particulate matter is by using the particulate matter as a dispersion aid in the dispersion polymerisation of the thermotropic polymer and with a subsequent melt compounding step using efficient compounding equipment.

The beneficial dispersion of the specified particulate matter in the melt can be monitored by examination of the morphology of the solid articles formed from the melt. According to this aspect of the invention there is provided a thermotropic polymer composition comprising a thermotropic polymer and a disclination density-controlling particulate additive having at least 95% by weight of particles with at least one dimension less than 1 micron dispersed in the thermotropic polymer so that the average separation of particles of the additive is less than 10 microns, and preferably less than 2 microns, when the additive is present at a concentration of 1% by volume of the composition. Preferably the disclination density-controlling particulate additive is an anisotropic material in which the largest average dimension of the particles is not less than the average separation between the particles. The composition is most effective if it has been prepared by a dispersion polymerisation process in the presence of the particulate additive followed by melt compounding of the particulate polymer product of the dispersion process.

The compositions of the invention may include a variety of materials conventionally present in moulding compositions. These include fillers of the reinforcing or non-reinforcing type, in both fibrous or particulate form, pigments and other colourants, light and heat stabilisers, nucleants, mould release agents, plasticisers, fire retardant additives, foaming agents and various other specific additives such as polymeric toughening agents. Compositions containing glass and carbon fibres have particularly good properties.

The compositions containing these additional additives may be prepared by the conventional techniques, such as by compounding in a screw extruder or by including the materials during the polymerisation cycle or by blending in appropriate solvents.

Although a prime application of the compositions of the invention is as injection moulding powders they may be used in any situation where their high levels of physical properties can be used to advantage. These include extrusion applications and for use as films and fibres.

The invention is further illustrated by reference to the following examples.

These examples show the improvement in moulding behaviour and properties obtained from compositions according to the invention. In addition they show the importance of obtaining a uniform dispersion of particulate material to achieve the benefits of the invention.

EXAMPLE 1

Examples 1 and 2 illustrate the improvement obtained when organophilic layer minerals are finely dispersed by treatment with an organic "swelling" solvent and coated onto polymer particles, followed by drying, extrusion compounding and moulding compared to polymer compounded and moulded in the absence of the layer minerals.

A dioctadecyl dimethyl ammonium exchanged hectorite, sold as 'Bentone 38' by NL Chemicals Ltd, was dispersed in methylene chloride at 5% wt/volume using a Silverson high shear mixer. The clay formed a high viscosity gel and was mixed with 1 kg of polymer chip 2–3 mm in diameter. The mixture was continuously stirred whilst the solvent was removed by gently heating on a water bath. The polymer was coated with 1.0% by weight of the 'Bentone' 38. A control sample was treated in the same way but excluding the 'Bentone' 38.

The clay had an organic content of 36.7% and a swelling volume of 68 mls in methylene chloride. The settling volumes of the 'Bentone' 38 in 100 mls of methylene chloride measured at 1% and 0.1% wt/volume (based on the inorganic content weight) were 100 mls and 11 mls at equilibrium. Measurement of the particle size using an Andreasen pipette indicated that 83.6% by weight of the 'Bentone' 38 had a particle size less than 4.1 um. Transmission electron microscopy showed the 'Bentone' 38 platelets to be anisotropic, typically being lath or ribbon like, having dimensions of the order of 1 um long, 0.1 um wide and 20 nm in thickness.

The anisotropic melt forming polymer was a wholly aromatic polyester formed in accordance with the teachings of U.S. Pat. No. 4,161,470 and consisted of 73 mole per cent of p-benzoyl units and 27 mole per cent of 2,6 oxy naphthoyl units.

After removal of most of the methylene chloride the control and the coated polymer chip were dried in a vacuum oven overnight at 120° C. The chip was compounded using a Gays (Hampton) Ltd TS40 Twin Screw Compounding Extruder and regranulated. The melt flow index of the samples was measured after drying at 120° C. using a Davenport Flow Tester at 310° C. using a 1.18 mm diameter die of length 8 mm and an applied load of 2.16 kg using the procedure of ASTM D 1238.

The chip was moulded into standard 3 mm thick tensile test bars using a Boy 15S Dipronic injection moulding machine fitted with a 24 mm diameter screw with an L/D ratio of 17.

Melt plasticisation was carried out using a screw speed of 297 rpm and a back pressure of 50 MPa. The injection was done with a nozzle temperature of 310° C., a melt pressure of 70 MPa, an injection speed setting of 20 and an injection time of 15 seconds. Flexural modulus and flexural strength were measured on test bars in accordance with ASTM D790-71. ASTM D638-72 was used to measure tensile strength. The results are shown in Table 1.

TABLE 1

| % wt/wt Ash from Bentone 38 | Flexural Modulus GPa | Flexural Strength MPa | Tensile Strength MPa | Melt Flow Index 2.16 kg at 310° C. |
|---|---|---|---|---|
| 0 | 12.3 | 218 | 176 | 13.0 |
| 0.63 | 12.5 | 216 | 209 | 15.2 |

EXAMPLE 2

The procedure of Example 1 was repeated using a dioctadecyl dimethyl ammonium exchanged bentonite sold as 'Claytone' 40 by ECC International.

The clay had an organic content of 38.7% and a swelling volume of 100 mls in methylene chloride. The setting volume in methylene chloride measured at 1% and 0.1% wt/volume were 100 mls and 17 mls at equilibrium. Measurement of the particle size using an Andreasen pipette indicated that 64.5% of weight of the Claytone 40 had a particle size less than 4 μm.

Chip was coated with 2.5% by wt of Claytone 40 using the procedure described in Example 1 and moulded into 3 mm tensile test bars. Melt plasticisation was carried out using a screw speed of 240 rpm and a back pressure of 25 MPa. The injection was done with a nozzle temperature of 300° C., a melt pressure of 76 MPa, an injection speed setting of 20 and an injection time of 10 seconds. The results are shown in Table 2.

TABLE 2

| % wt/wt Ash from Claytone 40 | Flexural Modulus GPa | Flexural Strength MPa | Tensile Strength MPa | Melt Flow Index 2.16 kg at 310° C. |
|---|---|---|---|---|
| 0 | 11.5 | 217 | 181 | 14.7 |
| 1.53 | 11.7 | 220 | 208 | 14.8 |

EXAMPLE 3

The procedure of Example 1 was repeated using a hydrophobic silica sold by Degussa as 'Aerosil R972' having a quoted average particle size of 16 nm. The silica was dispersed in the methylene chloride using a random copolymer of 40 mole % methyl methacrylate, 40 mole % styrene, 10 mole % ethyl hexyl acrylate and 10% acrylic acid. The settling volume of 1% wt/volume of Aerosil R972 in the presence of 0.36% of the random copolymer was 100 mls.

Chip was produced using the procedure described in Example 1 and moulded into 3 mm tensile test bars. Melt plasticisation was carried out using a screw speed of 150 rpm and a back pressure of 10 MPa. The injection conditions were nozzle temperature 300° C., a melt pressure of 76 MPa, an injection speed setting of 20 and an injection time of 5 seconds. The results are shown in Table 3.

TABLE 3

| % Ash R972 Silica | % Acrylic Copolymer | Flexural Modulus GPa | Flexural Strength MPa | Tensile Strength MPa | Melt Flow Index 216 kg at 310° C. |
|---|---|---|---|---|---|
| 0 | 0 | 10.7 | 175 | 185 | 13.4 |
| 0.2 | 0.07 | 10.4 | 182 | 202 | 14.2 |

EXAMPLE 4

This example illustrates the improvement obtained when hydrophilic layer minerals are swelled and finely dispersed in water and coated onto polymer particles, dried and extrusion compounded and moulded and compared to polymer compounded and moulded in the absence of the layer minerals.

A bentonite powder, sieved to less than 125 μm (supplied by BDH Chemicals) was dispersed in deionised water at 1% wt/volume. After leaving overnight 18 hrs after which time 35% by volume had sedimented. The material remaining suspended in the water was separated, centrifuged to produce a slurry with a solids content of 6%. The slurry was mixed with 1 kg polymer chip 2-3 mm in diameter to give 1% by weight of bentonite with respect to the polymer weight. The mixture was continuously stirred whilst the water was removed by gently heating on a hot plate. A control sample was treated in the same way.

The swelling volume in deionised water was 70 mls and the settling volume of the fractionated bentonite in 100 mls of deionised water measured at 1% wt/volume was 100 mls at equilibrium. Measurement of the particle size using an Andreasen pipette indicated that 93.7% was less than 7.6 μm.

The coated chip was compounded and moulded using the conditions described in Example 1. The results are shown in Table 4.

TABLE 4

| % wt/wt Ash from Bentonite | Flexural Modulus GPa | Flexural Strength MPa | Tensile Strength MPa | Melt Flow Index 2.16 kg at 310° C. |
| --- | --- | --- | --- | --- |
| 0 | 12.4 | 214 | 182 | 13.8 |
| 1 | 12.8 | 217 | 197 | 15.0 |

Examples 5-13 illustrate the properties when organophilic layer minerals are finely dispersed in an organic media and coated onto polymer particles during dispersion polymerisation. Following polymerisation the organic media is washed off the coated polymer particles which are then dried and moulded.

EXAMPLE 5

A heatable reaction vessel fitted with an agitator, partial condenser, receiver vessel, thermocouples and N$_2$ inlets was charged with 2,6 hydroxynapthoic acid (263 parts by wt) p-hydroxybenzoic acid (521 parts by wt), terepthalic acid (2 parts by wt), acetic anhydride (553 parts by wt) and potassium acetate (0.1 parts by wt). The contents of the reactor were heated to reflux over a period of 15 mins, with stirring (300 rpm). After a reflux period of 100 mins the contents were heated to 190° C. over a period of 30 mins and ~90% of the available acetic acid acetylation by-product was collected.

In a second reactor the dispersion medium was prepared comprising liquid paraffin (Castrol 'Whitemor') (922 parts by wt) and 90 parts by wt of a gel of 'Bentone' 38 in 'Whitemor' WOM14. The gel was produced using a Hobart high shear mixer model VCM40. A mixture of 90 parts liquid paraffin and 10 parts of 'Bentone' 38 was homogenised using slow stirring for 1 min prior to high shear mixing at full speed over a period of 20 mins. 3 parts propylene carbonate was then added at slow speed and the dispersion gelled using full speed over a period of 20 secs. The settling volumes of the 'Bentone' 38 in 100 ml 'Whitemor' WOM14 measured at 1% and 0.1 wt/volume (based on the inorganic content weight) were 100 mls and 16 mls at equilibrium.

The dispersion medium was heated to 170° C. with stirring (400 rpm). The acetylated monomers were transferred from the first reactor to the second where they dispersed in the paraffin immediately. The contents were heated to 300° C. over a period of 75 mins. Antifoaming agent ('Bevaloid' 6420) was added when necessary. At 300° C. the reaction was sparged for 100 mins. The proportion of 'Bentone' 38 with respect to the acetylated monomer weight was 0.9%. The ratio of acetylated monomers to liquid paraffin was 1:1 wt/wt.

The product was cooled, filtered, stirred in Genklene, filtered, washed and dried.

The polymer was moulded using the conditions described in Example 2. The results are shown in Table 5

TABLE 5

| % wt/wt Ash from Bentone 38 | Flexural Modulus GPa | Flexural Strength MPa | Tensile Strength MPa | Melt Flow Index 2.16 kg at 310° C. |
| --- | --- | --- | --- | --- |
| 0.84 | 12.6 | 214 | 209 | 1.8 |

EXAMPLE 6

The procedure of Example 5 was repeated with the following exceptions. The terepthalic acid content was 5 parts by wt. The heat transfer medium was Shell 'Pallidex' 17 liquid paraffin and the proportion of 'Bentone' 38 with respect to the acetylated monomer weight was 0.6%.

The settling volume of the 'Bentone' 38 in 'Pallidex' 17 at 1% and 0.1% was 100 mls and 25 mls.

Test bars were moulded using the conditions described in Example 1. The results are shown in Table 6.

TABLE 6

| % wt/wt Ash from Bentone 38 | Flexural Modulus GPa | Flexural Strength MPa | Tensile Strength MPa | Melt Flow Index 2.16 kg at 310° C. |
| --- | --- | --- | --- | --- |
| 0.54 | 12.3 | 217 | 205 | 5.0 |

EXAMPLE 7

A reactor fitted as in Example 5 was charged with 2,6 acetoxy naphthoic acid (321 parts by wt), p-acetoxy benzoic acid (679 parts by wt), acetic anhydride (24 parts by wt), 40/40/10/10 copolymer of styrene/methyl methacrylate/ethyl acrylate/acrylic acid (1 parts by wt, 0.1% on monomers), 'Aerosil' R972 (2.75 parts by wt, 0.275% on monomers), potassium acetate (0.05 parts by wt) and 'Santotherm' 66 (800 parts by wt), (1/1 ratio with monomers). The mixture was then heated to 220° C. over ~60 mins under N$_2$. The mixture was stirred gently initially (~100 rpm) but the stirrer speed was increased to 450-550 rpm once the monomers had melted to a clear solution at ~170° C. The temperature of the reaction medium was raised from 220° C. to 320° C. over a period of 40 mins with constant evolution of acetic acid (~97% evolved). Product precipitated from solution at ~270° C. The reaction was held at 320° C. for 30 mins and allowed to cool. The product was filtered, stirred in Genklene, filtered washed with Genklene and dried.

The sedimentation volume of the R972 silica was measured in the presence of the acrylic copolymer in 100 mls of 'Santotherm'. At 1% R972, 0.35% acrylic copolymer (wt/volume) the settling volume was 100 mls. At 0.1% R972, 0.35% acrylic copolymer the settling volume was 50 mls.

The powder was moulded and tested using the conditions described in example 1. The results are shown in Table 7.

TABLE 7

| % wt/wt Ash from R972 Silica | % wt/wt Acrylic Co-polymer | Flexural Modulus GPa | Flexural Strength MPa | Tensile Strength MPa | Melt Flow Index 216 kg at 310° C. |
|---|---|---|---|---|---|
| 0.39 | 0.14 | 12.5 | 214 | 197 | 3.5 |

EXAMPLE 8

A reactor fitted as in Example 5 was charged with 2,6 hydroxynapthoic acid (12 parts by weight), p-hydroxybenzoic acid (326 parts by wt.), hydroquinone (228 parts by wt.), isophthalic acid (343 parts by wt.) acetic anhydride (702 parts by wt.) and potassium acetate (0.1 parts by wt.). The mixture was heated to reflux over 20-30 mins and maintained at reflux for 100 mins with slow stirring. This mixture was then transferred to a second vessel equipped in the same way as the first which contained liquid paraffin (960 parts) (Castrol Whitemor WOM14) preheated to 125° C. The temperature was increased to 240° C. over 100 mins. At 240° C. Claytone 40 (27 parts by wt., 2.2% on the acetylated monomer weight) dispersed by stirring in liquid paraffin (270 parts by wt.) was added to the reaction in mixture. (The settling volume of the Claytone 40 in 100 mls of liquid paraffin at 1% wt/volume was 11.5). The stirrer speed was increased to 600 rpm and the monomer melt dispersed in the liquid paraffin. The temperature was taken to 300° C. over a period of 60 mins and the evolved acetic acid collected. The reaction mixture was sparged and purged for 110 mins at 300° C.

The product was cooled, filtered, stirred in Genklene, filtered, washed with Genklene and dried. The melt flow index was measured at 340° C. using a 1.18 mm diameter die and an applied load of 5 kg. The powder obtained was moulded using the conditions described in Example 1 except the nozzle temperature was 340° C. The results are shown in Table 8.

EXAMPLE 9

The composition described in Example 8 was prepared using the procedure described in Example 5, except the proportion of 'Bentone' 38 was 2.2% with respect to the acetylated monomer weights. The inorganic material was more finely dispersed in the heat transfer medium prior to coating onto the polymer during polymerisation as seen by the larger settling volume. The powder obtained was moulded under the same conditions as in Example 8. The improvement in properties as a result of using more finely divided inorganic material is shown in Table 8.

EXAMPLE 10

The procedure of Example 9 was repeated except the proportion of 'Bentone' 38 was 1.5% with respect to the acetylated monomer weight. The powder obtained was moulded under the same conditions as in Example 8. The thinner coating of inorganic material is more readily mixed into the polymer by melt plasticisation during injection moulding. The improvement in properties is shown in Table 8.

EXAMPLE 11

The procedure of Example 9 was repeated using 0.9% by wt 'Bentone' 38.

EXAMPLE 12

The particle size of the majority of the powder produced in Example 11 was in the range 50 to 250 um. 1% by weight of the powder had a particle size less than 50 μm. The ratio of 'Bentone' 38 to polymer in this fine fraction was 10 times greater than in the bulk of the product. Consequently, the 'Bentone' 38 in this fraction is not as readily dispersed in the polymer. This fraction was removed by sedimentation in Genklene. The fine fraction remained suspended and was separated by decantation. The remaining material was dried and moulded using the same conditions described in Example 8. The results are shown in Table 8.

EXAMPLE 13

The procedure of Example 11 was repeated. The powder obtained was compounded into chip using a Gays (Hampton) Ltd TS 40 twin screw compounding extruder so as to produce a further improvement in the dispersion of the inorganic material in the polymer. The chip was moulded using the same conditions as in Example 8. The results are shown in Table 8.

TABLE 8

| Example No. | % wt/wt Ash from Clay | Flexural Modulus GPa | Flexural Strength MPa | Tensile Strength MPa | Melt Flow Index 5 kg at 340° C. |
|---|---|---|---|---|---|
| 8 | 2.0 | 13.0 | 240 | 180 | 2.0 |
| 9 | 2.1 | 13.0 | 240 | 195 | 3.9 |
| 10 | 1.4 | 13.0 | 260 | 236 | 2.6 |
| 11 | 0.87 | 13.3 | 268 | 243 | 2.1 |
| 12 | 0.66 | 13.7 | 271 | 250 | 2.0 |
| 13 | 0.72 | 15.0 | 283 | 250 | 3.3 |

EXAMPLE 14

The melt viscosity of the composition described in Example 1 compared to the control was measured as a function of temperature at a shear rate of $10s^{-1}$ using a Rheometric Dynamic Spectrometer. Table 9 shows that the presence of the additive gives a reduction in melt viscosity with temperature.

TABLE 9

| Temperature °C. | Melt Viscosity $Ns/m^2$ at $10s^{-1}$ | |
|---|---|---|
| | Control | 1% Bentone 38 |
| 296 | 2600 | 510 |
| 299 | 820 | 300 |
| 302 | 300 | 180 |
| 308 | 200 | 130 |
| 314 | 180 | 120 |
| 320 | 160 | 110 |

EXAMPLE 15

The procedure of Example 1 was used to prepare samples containing respectively 0 and 1% of 'Bentone' 38 clay. The effect of applying various pre-shear treatments prior to injection moulding test pieces was examined using a Boy 15S Dipronic injection moulding machine filled with a 24 mm diameter screw with an L/D ratio of 17.

The injection was done at various melt plasticisation screw speeds with a nozzle temperature of 300° C., a melt pressure of 70 MPa, an injection speed setting of 20 and an injection time of 15 seconds. The tensile strength was measured according to ASTM D 638-72. The results obtained are shown in Table 10.

TABLE 10

| Bentone 28 (% by wt) | Tensile Strength MPa at screw speed indicated below | | |
|---|---|---|---|
| | 90 rpm | 150 rpm | 297 rpm |
| 0 | 175 | 177 | 186 |
| 1 | 190 | 192 | 196 |

These results indicate that although a beneficial effect is obtained by preshearing the melt containing no clay, an additional improvement is obtained as a result of preshearing when the clay is present.

In a preferred process the anisotropic compositions of the invention containing from 0.05 to 5.0% of the finely divided particulate additive wherein the additive is a material having at least one dimension less than 1 micron is sheared between relatively moving surfaces at a shear rate of at least 100 sec$^{-1}$, preferably at least 250 sec$^{-1}$ prior to the melt being formed into a shaped article. It is known that pre-shearing will improve the processibility of anisotropic melts and that articles shaped from the melt whilst it is in the condition of improved processability, that is reduced viscosity, exhibit improved properties. In the present case a further improvement in properties can result from the presence of the particulate additive.

EXAMPLE 16

In this example a comparison is made of two polymers both having the same chemical composition (73 mole % p-benzoyl units:23 mole % 2,6 oxy naphthoyl units) but made respectively by the melt polymerisation process of U.S. Pat. No. 4,161,470 and by the process of the present invention (Example 5). The melt polymerised product (having a Melt Flow Index of 13.0) was compounded as described in Example 1 of the present invention (in the absence of any 'Bentone' 38). The dispersion polymerised product was made according to the general procedure of Example 5 of the present invention (using 'Bentone' 38 as dispersion polymerisation aid), so as to have a Melt Flow Index of 14.3 (measured at 310° C. as described in Example 1). After polymerisation this product was given the same compounding treatment as described in Example 1.

Both materials were moulded into test bars as described in Example 1, melt plasticisation was carried out using a screw speed of 297 rpm and a back pressure of 25 MPa. The mouldings were prepared over a range of processing temperatures. In each case the nozzle barrel temperatures of the injection moulding machine were kept the same. The other moulding parameters were as described.

Mechanical properties were measured on the test bars and are recorded in Example 2. In the table the melt polymerised material is designated polymer A and the dispersion polymerised material containing 'Bentone' 38 is designated polymer B.

TABLE 11

| Processing Temp. (°C.) | Tensile Strength (MPa) | | Flexural Modulus (GPa) | | Flexural Strength (MPa) | |
|---|---|---|---|---|---|---|
| | Polymer A | Polymer B | Polymer A | Polymer B | Polymer A | Polymer B |
| 260 | Not Mouldable | 232 | Not Mouldable | 13.0 | Not Mouldable | 206 |
| 270 | 156 | 191 | 12.6 | 12.9 | 198 | 199 |
| 280 | — | 169 | — | 12.4 | — | 198 |
| 290 | 163 | 181 | 10.4 | 12.0 | 185 | 198 |
| 300 | 172 | 219 | 10.4 | 11.7 | 183 | 196 |
| 310 | 168 | 226 | 9.9 | 10.9 | 179 | 191 |
| 320 | — | 229 | — | 10.7 | — | 190 |
| 330 | 161 | — | 9.6 | — | 175 | — |

These results indicate that for the given polymers comparable melt flow index Polymer B can be moulded at a lower temperature than Polymer A, that significant improvements in properties are obtained for polymer B over a wide range of processing temperatures and that polymer B is less susceptible to loss of properties at high moulding temperatures.

The distribution of the particulate additive in polymer B in mouldings fabricated at 300° C. was examined by sectioning a moulding, plasma etching the surface and particle distribution analysis on micrographs taken by using a scanning electron microscope. A moulding was cut in a direction perpendicular to the direction of flow in the injection moulding. The cut face was first polished using 600 grit carborundum paper followed by progressively finer abrasives finishing with 1 micron 'Hypres' diamond paste. The polished surface was then plasma etched using a 'Nanotech' Plasmaprep 100 at 100 watts and 0.6 torr for 20 minutes. Micrographs of the surface were taken using a scanning electron microscope. The micrographs produced were analysed using a 'Kontron' SEM-IPS Image Analyser. The analysis showed the mean inter-particle distance to be 1.4 micron with a minimum separation of 0.6 microns and a maximum separation of 3.3 microns. A typical micrograph of the moulding is shown as FIG. 1.

We claim:

1. A thermotropic polymer composition comprising a thermotropic polymer and 0.025 to 5% by weight of the composition of a disclination density-controlling particulate additive having at least 95% by weight of particles with at least one dimension less than 1 micron dispersed in the thermotropic polymer so that the average separation of particles of the additive is less than 10 microns, when the additive is present at a concentration of 1% by volume of the composition.

2. A thermotropic polymer composition according to claim 1 in which the said particulate additive is an anisotropic material in which the largest average dimension of the particles is not less than the average separation between the particles.

3. A thermotropic polymer composition according to either of claims 1 or 2 in which the composition has been prepared by a dispersion polymerisation process in the presence of the particulate additive followed by melt compounding of the particulate polymer product of the dispersion process.

4. A thermotropic polymer composition according to claim 1, wherein said dimension is less than 0.1 micron.

5. A thermotropic polymer composition according to claim 1, wherein the average separation is less than 2 microns.

* * * * *